(12) United States Patent
Ganji

(10) Patent No.: US 7,620,001 B2
(45) Date of Patent: Nov. 17, 2009

(54) COMMUNICATION SYSTEM AND METHOD WITH MOBILE DEVICES

(75) Inventor: Kiran K. Ganji, Irving, TX (US)

(73) Assignee: Good Technology, Inc., Santa Clara, CA (US)

( * ) Notice: Subject to any disclaimer, the term of this patent is extended or adjusted under 35 U.S.C. 154(b) by 625 days.

(21) Appl. No.: 10/964,912

(22) Filed: Oct. 13, 2004

(65) Prior Publication Data

US 2006/0077940 A1    Apr. 13, 2006

(51) Int. Cl.
  *H04W 4/00*    (2006.01)
(52) U.S. Cl. ...................................... 370/313
(58) Field of Classification Search ................. 370/350, 370/313, 324, 496; 455/418
  See application file for complete search history.

(56) References Cited

U.S. PATENT DOCUMENTS 6,424,841 B1 *   7/2002   Gustafsson ................. 455/466
7,177,865 B2 *   2/2007   Sasaki et al. ................... 707/7
7,193,985 B1 *   3/2007   Lewis et al. ................. 370/338
7,269,433 B2 *   9/2007   Vargas et al. ................ 455/502

\* cited by examiner

*Primary Examiner*—Ricky Ngo
*Assistant Examiner*—Chandrahas Patel
(74) *Attorney, Agent, or Firm*—Blakely, Sokoloff, Taylor & Zafman LLP

(57) ABSTRACT

A system comprises a plurality of mobile devices each operable to communicate via a computer network, a gateway operable to communicate with the plurality of mobile devices via the computer network, and a database coupled to the gateway. The plurality of mobile devices are each operable to periodically transmit a heartbeat message to the gateway, where the heartbeat message includes an address and a device identifier of the mobile device. The gateway is operable to store the address and device identifier in the database and send an acknowledgement message in response to each received heartbeat message.

13 Claims, 3 Drawing Sheets

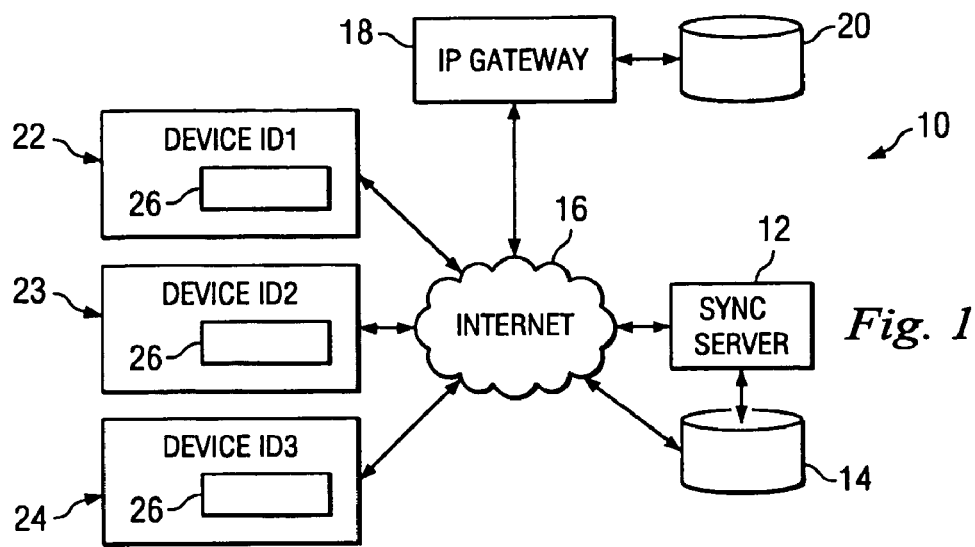
Fig. 1
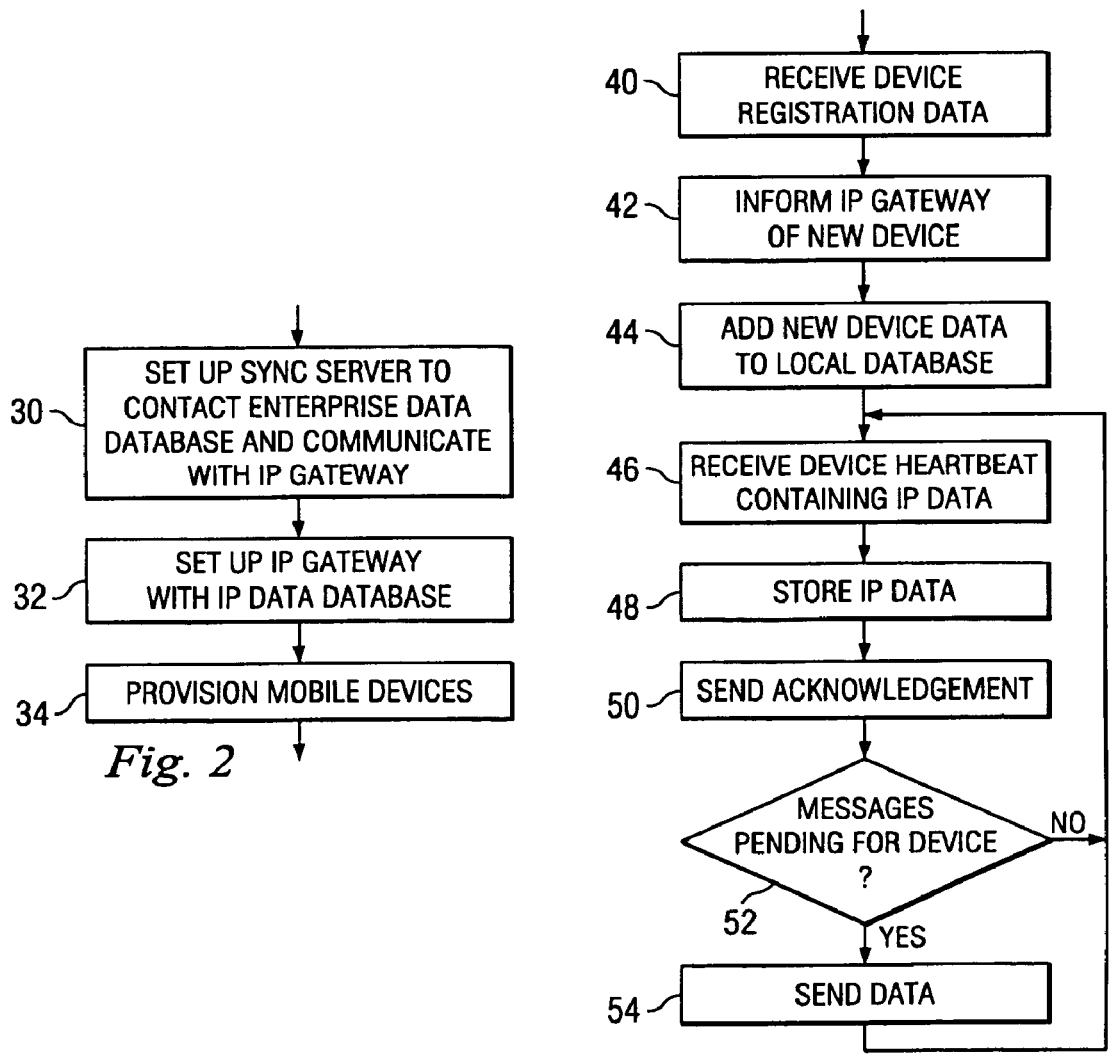
Fig. 2
Fig. 3

COMMUNICATION SYSTEM AND METHOD WITH MOBILE DEVICES

BACKGROUND

One of the most important milestones in the wireless communications is the arrival of third generation or 3G technology and devices that are capable of transferring voice and data at much higher speed. One new development in mobile device technology is the use of Internet Protocol (IP) addresses to identify and communicate with mobile devices. However, using IP addresses to identify and communicate with a mobile device brings some unresolved issues. For example, carriers responsible for the communication to and from the mobile devices may change the IP address assignment frequently and arbitrarily. Different carriers may also have different policies regarding the frequency and manner of assigning the IP addresses. Therefore, it is unknown, at any moment, what is the current IP address of the mobile devices.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIG. 1 is a simplified block diagram of an embodiment of a system for communicating with mobile devices;

FIG. 2 is a simplified flowchart of an embodiment of a process for setting up a system for communicating with mobile devices;

FIG. 3 is a simplified flowchart of an embodiment of a process for communicating with mobile devices;

DETAILED DESCRIPTION

Figure 4:
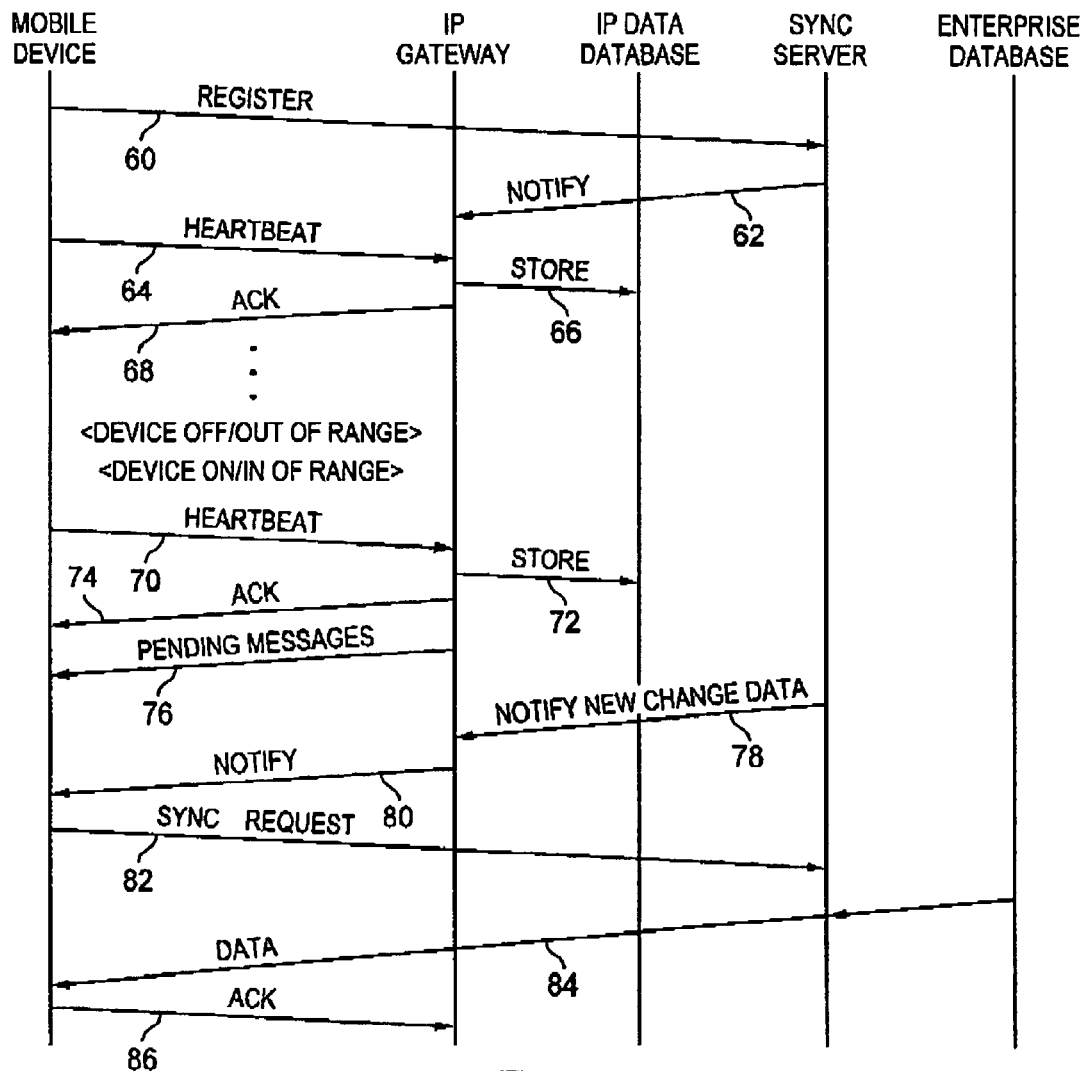
FIG. 4 is a message flow diagram of an embodiment of a process for communicating with mobile devices.

The problem of not knowing what the current IP address for the IP-based mobile devices is addressed herein. Because these mobile devices are required to synchronize their data with enterprise data, such as electronic mail, calendar, tasks list, address book, notes, etc., the enterprise system needs to know the current IP addresses of the mobile devices in order to continuously synchronize the data. Described herein is a system and method that enables mobile devices to periodically update the enterprise system of its current IP address and other information, so that continuous data synchronization may be performed.

FIG. 1 is a simplified block diagram of an embodiment of a system 10 for communicating with mobile devices. A synchronizing server 12 is in communication with an enterprise data database 14. Database 14 may store enterprise or back-end data associated with a business entity, an organization, an business activity, etc. The description herein will specifically refer to communications using UDP (User Datagram Protocol) and/or TCP/IP (Transmission Control Protocol/Internet Protocol), but system 10 may be adapted to use other suitable protocols now known or later developed. Both synchronizing server 12 enterprise data database 14 are in communication with the Internet or another computer network 16. Via the Internet 16, synchronizing server 12 may communicate with an IP gateway 18 and an IP data database 20 associated therewith. Database 20 may store data associated with a plurality of devices 22-24, which may be mobile devices. More specifically, database 20 is used to store data associated with communicating with devices 22-24 such as device identifiers (device IDs), IP addresses, IP port number, and the messages communicated or to be communicated therebetween. Synchronization server 12 is operable to maintain the user and device states and to perform data synchronization between devices 22-24 and enterprise data database 14. IP gateway 18 and devices 22-24 that have been registered remain in contact so that data synchronization can be performed. A client software code 26 executes on each of the devices 22-24 and is operable to contact IP gateway 18 periodically to inform it of its current IP address and other related data.

Referring also to FIG. 2 for a simplified flowchart of an embodiment of a process for setting up a system for communicating with IP-based devices. Synchronization server 12 and enterprise data database 14 are set up to be able to communicate with one another and with IP gateway 18 in block 30. Synchronization server 12, database 14 and IP gateway are provided with one another's IP address, for example. Further, IP gateway 18 and IP data database 20 are set up to communicate with one another in block 32. In block 34, devices 22-24 are also provisioned with the client software code and the IP address of IP gateway 18 so that it is able to contact and communicate with the IP gateway. Client software code 26 is operable to send a heartbeat to IP gateway 18 that contains its current IP address and other information.

FIG. 3 is a simplified flowchart of an embodiment of a process for communicating with IP-devices. As new devices are deployed in system 10, each device first registers with system 10, for example, such as registering with synchronization server 12 in block 40. The new device may provide synchronization server 12 its device ID, IP address, and port number, for example. Synchronization server 12 then informs IP gateway 18 that a new device has been added to the system in block 42. IP gateway 18 then adds the new device and its associated data to IP data database 20 in block 44. After device registration, the client software on the new device begins to send heartbeat messages to IP gateway 18 in block 46. The heartbeat messages include embedded device ID, current IP address, and port number to which the device listens. The device ID may be used as the index to look for the current IP address and port number in the IP data database. The IP gateway stores the received IP data in the heartbeat messages in the IP data database in block 48. Alternatively, the IP gateway may update the IP data database only if the IP information for the device has changed. In block 50, IP gateway 18 sends an acknowledgement message to the device. The IP gateway also may determine whether there are any pending messages or other data for the device in block 52 and transmits the message or data to the device in block 54. Each device in system 10 thus communicates with the IP gateway periodically by sending a heartbeat message with embedded communication data. Because the IP address and the port number are embedded in the messages, they are not altered by any network translation done by the carrier transmitting the messages. Depending on the properties of the carrier, network traffic conditions, and other parameters, the devices may send a heartbeat message at a suitable interval such as every few seconds or every few minutes. The IP gateway and the devices may communicate using UDP or TCP/IP protocols, or any other suitable protocol.

FIG. 4 is a message flow diagram of an embodiment of a process for communicating with IP-based devices. The user first registers the mobile device with the synchronization server, as indicated by arrow 60. The synchronization server notifies the IP gateway, as indicated by arrow 62. Thereafter, the device sends periodic heartbeat messages to the IP gateway, and the IP gateway stores the IP data embedded therein, as indicated by arrows 64 and 66. The IP gateway then sends an acknowledgement (ACK) back to the device, as indicated in arrow 68. If the mobile device does not receive an acknowledgement to its heartbeat message, then it is either out of range or, more unlikely, the IP gateway is not operational. The mobile device will continue to send the heartbeat message, either at the normal interval or at adjusted intervals, to reach the IP gateway. For example, the mobile device may send the heartbeat message at shorter intervals until it receives an acknowledgement from the IP gateway.

If a mobile device is turned off, when it is turned back on, it immediately resumes sending the heartbeat messages to the IP gateway, as indicated by arrow 70. The IP gateway stores the communication data such as IP address and port number embedded in the IP data database and sends an acknowledgement message back to the device, as indicated by arrows 72 and 74. If there are pending messages for the device that were undeliverable while the device was off, out of range or otherwise unresponsive, the IP gateway transmits the pending messages to the device, as indicated by arrow 76. The synchronization server may also notify the IP gateway if there is new data or if data has changed in the enterprise data database, as indicated by arrow 78. The IP gateway then looks up the device's IP address and notifies the device, as indicated by arrow 80. In response to receiving the notification, the mobile device sends a synchronization request to the synchronization server, as indicated by arrow 82. The synchronization server retrieves the requested data from the enterprise database and sends the new or changed data to the mobile device, as indicated by arrow 84. The mobile device, upon successfully receiving and processing the transmitted data, sends an acknowledgement back to the IP gateway, as indicated by arrow 86.

Figure 5:
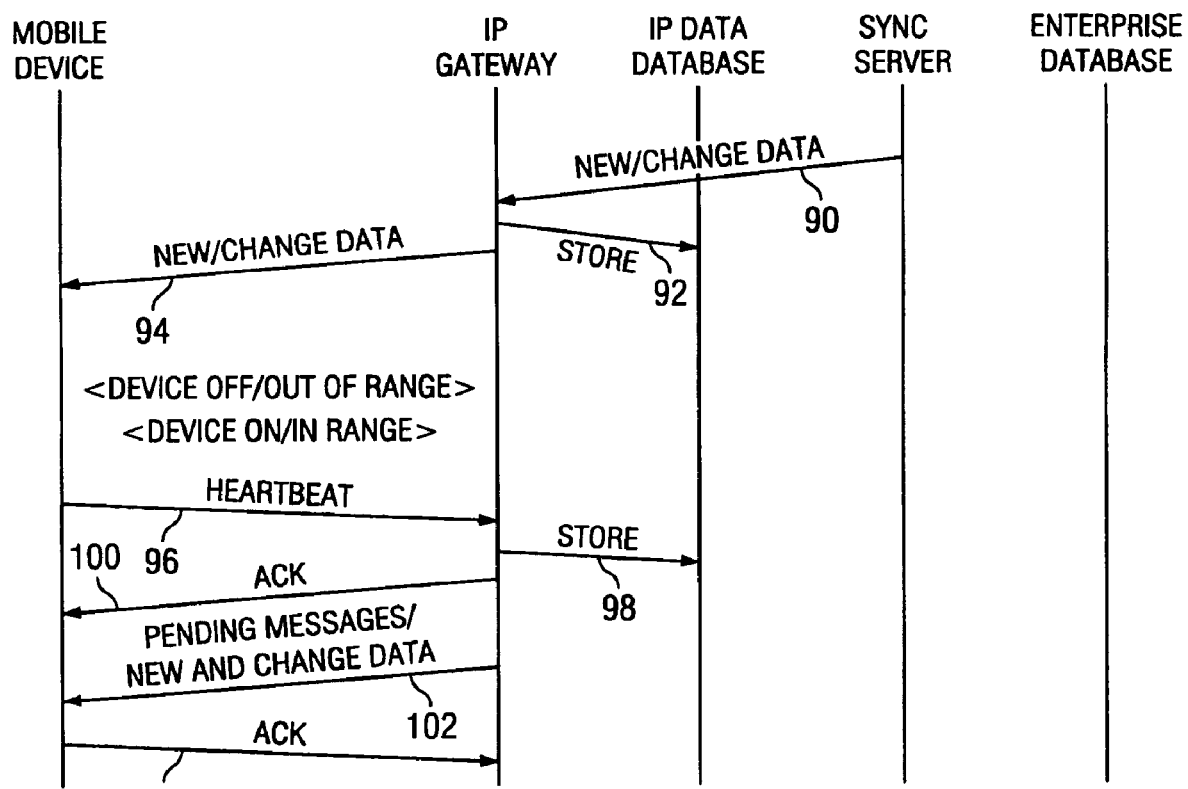
FIG. 5 is a message flow diagram of an embodiment of a process for communicating with mobile devices.

FIG. 5 is another message flow diagram of an embodiment of a process for communicating with IP-based devices. The synchronization server may send the new or the change data directly to the IP gateway, as indicated by arrow 90. The IP gateway may store this data in the IP data database and then transmits the new and change data to the mobile device, as indicated by arrows 92 and 94. If the device goes out of range or is turned off while this data transmission is taking place, then IP gateway does not receive an acknowledgement message from the mobile device indicating successful transmission. Therefore, the IP gateway may note that the stored data has not been successfully transmitted to the mobile device. When the device is turned back on, it immediately sends a heartbeat message to the IP gateway, as indicated by arrow 96. Similarly, if the mobile device is out of range, the IP gateway is not able to receive the heartbeat messages even though the mobile device continues to send them. Once the mobile device comes back into range, the IP gateway is able to receive the heartbeat messages and send back acknowledgements. The IP gateway stores the current IP data in the IP data database, as indicated by arrow 98. The IP gateway then sends an acknowledgment back to the mobile device, as indicated by arrow 100. Using the most current IP address, the IP gateway also sends the new and/or changed data that were not successfully delivered as well as any other pending messages stored in the IP data database to the mobile device, as indicated by arrow 102. The mobile device responds by sending an acknowledgement message to the IP gateway if the data is successfully received and processed.

The mobile devices and the IP gateway may share a secure identifier, which may be combined with an hash code using an encrypting algorithm. For example, an auto-increment index one-way hash and MD5 encryption may be used. Every message sent to the mobile device by the IP gateway includes the secure ID, the un-encrypted index, and a unique token generated using the secure ID and the index. Upon receiving the index, the client code in the mobile device compares it with its own index and ignores any message with an index that is less than or equal to its own index. If it finds an index that is greater than its own index, then it generates a MD5 hash of the index and the secure key and compares it with the token sent by the IP gateway. The client acts upon a message only if the two tokens match. Other suitable hash algorithms and encryption methods may be used.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A system comprising:
    a mobile device to periodically transmit a heartbeat message including a first Internet Protocol (IP) address of the mobile device and a device identifier of the mobile device to provide IP address updates for the mobile device, wherein the first IP address is embedded in data of the heartbeat message to prevent alteration by network translation;
    a gateway to receive the heartbeat message from the mobile device via a computer network and send an acknowledgement message in response to each received heartbeat message; and
    a database coupled to the gateway to store the first IP address and device identifier;
    wherein the gateway uses the received device identifier as an index to search the database for a previously stored IP address and replace the previously stored IP address with the first IP address if a difference is determined.

2. The system of claim 1, further comprising:
    a synchronization server operable to communicate with the gateway and the mobile device via the computer network; and
    an enterprise data database coupled to the synchronization server operable to store enterprise data for synchronization with the mobile device.

3. The system of claim 1, wherein the heartbeat message sent by the mobile device further comprises a port number to which the mobile device listens.

4. The system of claim 1, wherein the mobile device comprises communication code to generate and transmit the periodic heartbeat messages to the gateway.

5. A method comprising:
    receiving at an enterprise system, from a mobile device, a heartbeat message having an identifier and first Internet Protocol (IP) address of the mobile device to provide IP address updates for the mobile device, wherein the first IP address is embedded in data of the heartbeat message to prevent alteration by network translation;
    storing the identifier and the first IP address;

transmitting an acknowledgement message to the mobile device in response to receiving the heartbeat message;

comparing the first IP address received in the heartbeat message to a previously stored IP address;

notifying the mobile device at the first IP address of data available for the mobile device;

receiving a synchronization request from the mobile device; and transmitting synchronization data to the mobile device.

6. The method of claim 5, the heartbeat message further comprises a port number to which the mobile device listens.

7. The method of claim 5, wherein periodically generating and sending heartbeat messages by the mobile device comprises generating and sending heartbeat messages to an IP gateway via a computer network.

8. The method of claim 5, wherein transmitting an acknowledgement message in response to receiving the heartbeat message comprises using the first IP address of the mobile device received in the heartbeat message.

9. The method of claim 5, wherein notifying the mobile device comprises retrieving the previously stored address of the mobile device according to the identifier.

10. The method of claim 5, storing synchronization data at the enterprise system for later transmission to the mobile device when the mobile device is unresponsive.

11. A method comprising
receiving a heartbeat messages including a device identifier and a first Internet Protocol (IP) of a mobile device provide IP address updates for the mobile device, wherein the first IP address is embedded in data of the heartbeat message to prevent alteration by network translation;

storing the first IP address of the mobile device indexed by the respective device identifier;

transmitting an acknowledgement message in response to receiving each heartbeat message;

comparing the first IP address received in each heartbeat message to a previously stored IP address;

notifying the mobile device at the first IP address of data available for the mobile device transmitting synchronization data to the mobile device; and receiving an acknowledgement from the mobile device in response to successfully transmission and receipt of the synchronization data.

12. The method of claim 11, wherein receiving heartbeat messages further comprises a port number to which the mobile device listens.

13. A computer storage medium having software encoded thereon, the software performing a method comprising:

receiving at an enterprise system, from a mobile device, a heartbeat message having an identifier and first Internet Protocol (IP) address of the mobile device provide IP address updates for the mobile device, wherein the first IP address is embedded in data of the heartbeat message to prevent alteration by network translation;

storing the identifier and the first IP address;

transmitting an acknowledgement message to the mobile device in response to receiving the heartbeat message;

comparing the first IP address received in the heartbeat message to a previously stored IP address;

notifying the mobile device at the first IP address of data available for the mobile device;

receiving a synchronization request from the mobile device; and transmitting synchronization data to the mobile device.

* * * * *

UNITED STATES PATENT AND TRADEMARK OFFICE
CERTIFICATE OF CORRECTION

PATENT NO.       : 7,620,001 B2
APPLICATION NO. : 10/964912
DATED            : November 17, 2009
INVENTOR(S)      : Kiran K. Ganji It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 902 days.

Signed and Sealed this

Twenty-sixth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,620,001 B2 | Page 1 of 1 |
| APPLICATION NO. | : 10/964912 | |
| DATED | : November 17, 2009 | |
| INVENTOR(S) | : Kiran K. Ganji | |

It is certified that error appears in the above-identified patent and that said Letters Patent is hereby corrected as shown below:

At Column 1, Line 59, after "organization," change "an" to --a--.

At Column 2, Line 31, change "IP-devices." to --IP-based devices.--

At Column 4, Line 2, change "an hash" to --a hash--.

At Column 5, Line 26, Claim 11, change "comprising" to --comprising:--.

At Column 5, Line 2, Claim 11, change "heartbeat messages" to --heartbeat message--.

At Column 6, Line 2, Claim 11, change "each heartbeat" to --the heartbeat--.

At Column 6, Line 3, Claim 11, change "each heartbeat" to --the heartbeat--.

At Column 6, Line 6, Claim 11, change "device" to --device;--.

At Column 6, Line 1, Claim 12, change "receiving heartbeat messages" to --receiving the heartbeat message--.

At Column 6, Line 2, Claim 12, change "receiving heartbeat messages" to --receiving the heartbeat message--.

At Column 6, Line 13, Claim 12, change "messages" to --message--.

Signed and Sealed this

Twenty-third Day of November, 2010

David J. Kappos
*Director of the United States Patent and Trademark Office*